(12) United States Patent
Saka

(10) Patent No.: US 9,047,776 B2
(45) Date of Patent: Jun. 2, 2015

(54) APPARATUS FOR PROVIDING DRIVE ASSIST INFORMATION

(71) Applicant: Honda Motor Co., Ltd., Tokyo (JP)

(72) Inventor: Tasuku Saka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/176,274

(22) Filed: Feb. 10, 2014

(65) Prior Publication Data

US 2014/0225749 A1 Aug. 14, 2014

(30) Foreign Application Priority Data

Feb. 13, 2013 (JP) ................................ 2013-025701

(51) Int. Cl.
*G08G 1/0968* (2006.01)
*G08G 1/0962* (2006.01)
*G08G 1/0967* (2006.01)

(52) U.S. Cl.
CPC ........ *G08G 1/096855* (2013.01); *G08G 1/0968* (2013.01); *G08G 1/09626* (2013.01); *G08G 1/096716* (2013.01); *G08G 1/096741* (2013.01)

(58) Field of Classification Search
CPC ................. G08G 1/0968; G08G 1/096855
See application file for complete search history.

(56) References Cited

U.S. PATENT DOCUMENTS

| | | | |
|---|---|---|---|
| 7,177,762 B2* | 2/2007 | Bruelle-Drews | 701/443 |
| 8,344,864 B1* | 1/2013 | Al-Mutawa | 340/435 |
| 8,896,465 B2* | 11/2014 | Raz et al. | 340/905 |
| 2007/0226014 A1* | 9/2007 | Alemayehu et al. | 705/4 |
| 2007/0276577 A1* | 11/2007 | Kuge et al. | 701/96 |
| 2008/0151048 A1* | 6/2008 | Watanabe et al. | 348/143 |
| 2012/0280835 A1 | 11/2012 | Raz et al. | |

FOREIGN PATENT DOCUMENTS

| | | |
|---|---|---|
| DE | 102012200182 | 7/2013 |
| JP | 10-232137 | 9/1998 |
| WO | 00/05091 | 2/2000 |

OTHER PUBLICATIONS

European Search Report dated Aug. 13, 2014, 8 pages.

* cited by examiner

*Primary Examiner* — Van Trieu
(74) *Attorney, Agent, or Firm* — Rankin, Hill & Clark LLP

(57) ABSTRACT

An apparatus for providing drive assist information depending on a driving experience amount in a country and/or region where a host vehicle currently travels. The apparatus includes a processing unit configured to determine a country and/or region where a host vehicle currently travels, determine whether or not a driving experience amount of a driver in the determined country/region reaches a predetermined reference value, and to stop providing at least a part of the assist information related to the country and/or region where the host vehicle currently travels, if the driving experience value reaches the predetermined reference value.

12 Claims, 12 Drawing Sheets

Fig. 2

| Country | States | Position | Content | Inhibit Level |
|---|---|---|---|---|
| USA | ALL | ALL | In this country, there is no need to stop at a railroad crossing. | 1 |
| USA | ALL | ALL | In this country, right turn is allowed even at a red light. | 1 |
| USA | NY | ALL | In this state, ⋯. | 1 |
| USA | NY | N1234 | At this intersection, it is not allowed to cross a double yellow line to turn left. | |
| USA | NY | L2345 | A minimum speed limit of 30 km/h is set on this road section. | |
| ⋮ | ⋮ | ⋮ | ⋮ | ⋮ |
| USA | CT | ALL | In this state, ⋯. | 1 |
| USA | CT | N3456 | In this intersection, ⋯. | |
| USA | CT | L4567 | In this road section, ⋯. | |
| ⋮ | ⋮ | ⋮ | ⋮ | ⋮ |

| Identification Code | Experience Amount | | | | Latest Violation Date |
|---|---|---|---|---|---|
| | Country/Region | Cumulative Travel Time | Cumulative Travel Distance | Cumulative Number of Travels | |
| J12P23TYK | JP | 1520 | 35600 | 452 | 2000.3.26 |
| | DE | 20 | 540 | 3 | |
| | GB | 14 | 310 | 2 | |
| | US/NY | 32 | 725 | 4 | 2012.10.5 |
| | US/CT | 4 | 98 | 1 | |
| F34Q56S23 | FR | 980 | 25680 | 332 | |
| | CH | 43 | 756 | 5 | |
| | IT | 8 | 175 | 2 | |

(B)

| | Driver Information |
|---|---|
| Identification Code | J12P23TYK |
| Country/Region | US/NY |
| Experience Amount — Cumulative Travel Time | 32 |
| Experience Amount — Cumulative Travel Distance | 725 |
| Experience Amount — Cumulative Number of Travels | 4 |
| Latest Violation Date | 2012.10.5 |

Fig. 4
(A)
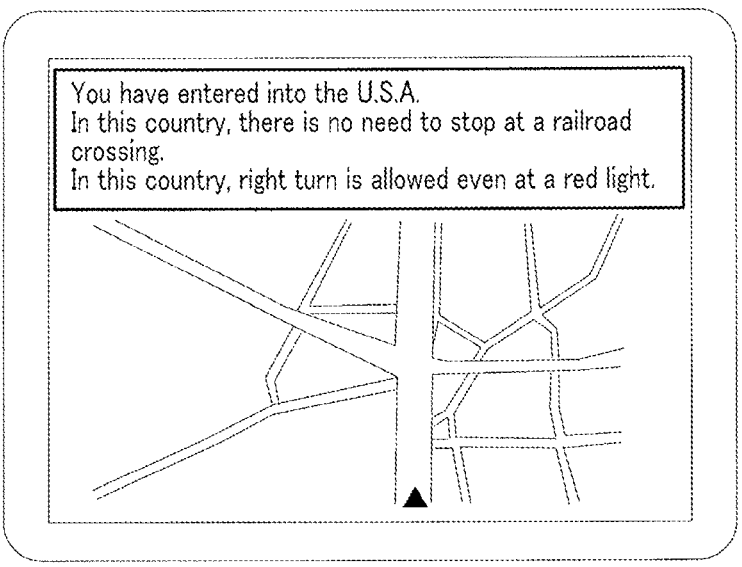
(B)
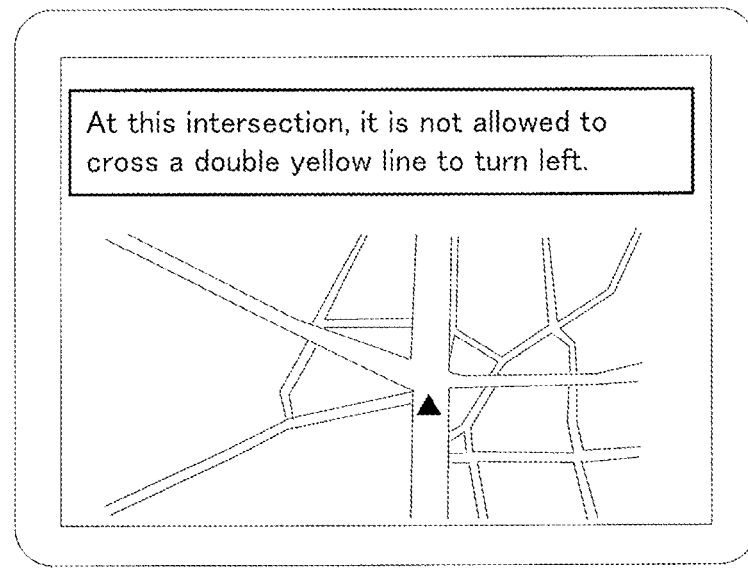

Fig. 12

| Country | States | Position | Content | Inhibit Level | Inappropriate Operation |
|---|---|---|---|---|---|
| USA | ALL | ALL | In this country, there is no need to stop at a railroad crossing. | 1 | stop |
| USA | ALL | ALL | In this country, right turn is allowed even at a red light. | 1 | |
| USA | NY | ALL | In this state, ···. | 1 | |
| USA | NY | N1234 | At this intersection, it is not allowed to cross a double yellow line to turn left. | | turn_left |
| USA | NY | L2345 | A minimum speed limit of 30 km/h is set on this road section. | | low_limit_30 |

APPARATUS FOR PROVIDING DRIVE ASSIST INFORMATION

BACKGROUND OF THE INVENTION

1. Field of the Invention

This invention relates to an apparatus for providing drive assist information such as traffic rules and traffic regulations for vehicle driving. More specifically, this invention relates to the apparatus that, when a host vehicle travels over several countries or regions each having the different rules or regulations, provides the assist information specific to the country and/or region depending on a degree of a driving experience of a driver in the country and/or region.

2. Related Art

The traffic rules or regulations are often, at least partly, different for each country and/or region (hereinafter written as "country/region") depending on the traffic condition such as the traffic volume and a development status of traffic infrastructure (e.g., highways, traffic facilities (e.g., traffic signals), etc.). For example, in the United Kingdom, for the purpose of easing the traffic congestion in London city, vehicles which travels in a particular area are imposed on the congestion charge which must be paid in advance. And, in the roundabout seen in Europe, which is a circular intersection connecting more than three roads via circular space, the running direction of vehicles in the intersection (clockwise or counter clockwise) and/or the passing priority between vehicles running therein and those entering thereto are regulated differently in each country. Further, in Asia and South America, there exist a country that restricts the car traffic through a bridge, a tunnel, etc., to vehicles having an odd or even registration number depending on a day of the week.

When the host vehicle travels through such countries/regions each having different traffic regulations, the driver needs to sufficiently obtain, in advance, information on the traffic rules and regulations for vehicle driving (hereinafter collectively referred to as "regulation information") specific to each country/region, in order to ensure smooth driving. However, when the driver has little experience of driving in such country/region, the driver may sometimes feel difficulty in recalling those information timely and performing appropriate driving behavior. Therefore, an apparatus for providing the regulation information which are related to the country/region where the host vehicle currently travels (hereinafter referred to as "current country/region"), as the drive assist information, is required.

So far, an information presenting apparatus for a vehicle which provides region-specific information is disclosed (see Patent Document 1). This apparatus provides information about adaptability of in-vehicle equipment against the regional peculiarity on vehicle driving such as noise regulations. And the apparatus also provides a recommended driving route taking into account the adaptability. More specifically, the apparatus searches for routes to a given destination, and obtains information of regional peculiarity of all regions along the searched routes from an information center via wireless communication. Then, the apparatus compares the obtained regional peculiarity (such as noise regulations) with specifications (e.g., noise characteristics) of a host vehicle. If the host vehicle can be adapted to the regional peculiarity of the all regions by e.g., limiting a vehicle speed, the apparatus shows the searched routes in an usual way with a guidance of driving operation necessary for the adaptation. Otherwise, the apparatus shows one or more routes for avoiding the regions having the regional peculiarity to which the host vehicle can not be adapted.

However, for a driver who has much driving experience in the country/region into which the host vehicle is going to enter (hereinafter referred to as "entering country/region"), the guidance on the familiar regulation information about the entering country/region performed repeatedly at each time of crossing a border of country/region may be annoying and may even result in disturbance for appropriate driving behavior.

PRIOR ART LIST

Prior Art Document

Patent Document 1: JP3293508 B2

SUMMARY OF THE INVENTION

Problem to be Solved

From the background described above, an apparatus to provide the drive assist information including the regulation information related to the current country/region, to the extent depending on a degree of driving experience of the driver in the country/region, is required.

Solution to the Problem

One aspect of the present invention is directed to an apparatus for providing drive assist information, which comprises a processing unit for managing provision of the drive assist information. The processing unit is configured to determine a country and/or region where a host vehicle currently travels, determine whether or not a driving experience amount of a driver in the determined country/region reaches a predetermined reference value, and stop providing at least part of the assist information related to the country and/or region where the host vehicle currently travels, if the driving experience value reaches the predetermined reference value.

In another aspect of the present invention, the processing unit is further configured to, based on information about traffic violations of the driver in the country and/or region where the host vehicle currently travels, reduce or reset to zero the driving experience amount related to the country and/or region when the driver commits a traffic violation.

In other aspect of the present invention, the at least part of the assist information which the processing unit stops providing in the case that the driving experience amount reaches the predetermined reference value is information for preventing traffic violations.

In further aspect of the present invention, at least one of a cumulative travel time, a cumulative travel distance, and a cumulative number of travels in the country and/or region where the host vehicle currently travels is used as the driving experience amount.

In still further aspect of the present invention, the processing unit is further configured to identify a current driver, and stop providing the at least part of the assist information depending on the driving experience amount of the identified current driver.

BRIEF DESCRIPTION OF THE DRAWINGS

FIG. 2 shows an example of regulation information data used in the apparatus according to the first embodiment.

FIG. 3(A) shows an example of driver data stored in a server which is used as an information source by the apparatus according to the first embodiment.

FIG. 3(B) shows an example of driver data used in the apparatus according to the first embodiment.

FIG. 4 shows an example of a screen display indicating regulation information in the apparatus according to the first embodiment.

FIG. 12 shows an example of regulation information data used in the apparatus according to the third embodiment.

DESCRIPTION OF EMBODIMENTS

The embodiments will now be described with reference to the accompanying drawings.

The information providing apparatus according to each embodiment of the present invention described below provides the regulation information for vehicle driving such as traffic rules and traffic regulations for preventing traffic violations as the drive assist information.

First Embodiment

The information providing apparatus according to a first embodiment of the present invention provide the regulation information on a display screen as text messages.

Figure 1:
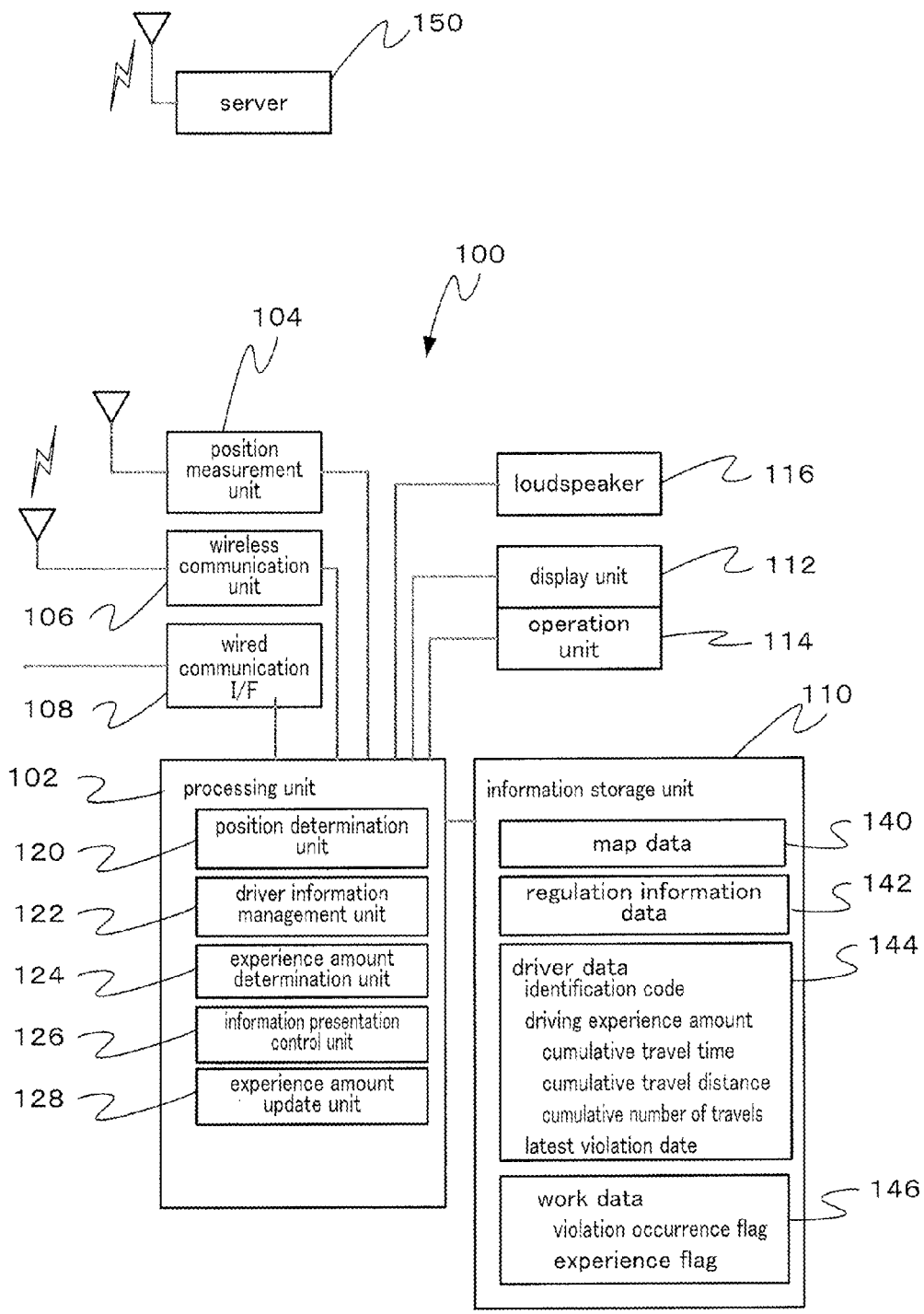
FIG. 1 shows a block diagram of an apparatus for providing drive assist information (hereinafter also referred as to "information providing apparatus") according to a first embodiment of the present invention.

FIG. 1 shows a block diagram of the apparatus according to the first embodiment.

The information providing apparatus 100 may be realized as e.g. in-vehicle navigation device. The apparatus 100 comprises a processing unit 102, a position measurement unit 104, a wireless communication unit 106, a wired communication interface (I/F) 108, an information storage unit 110, a display unit 112, an operation unit 114, and a loudspeaker 116.

The display unit 112 includes a display device for providing text messages and graphics such as a map. The unit 112 may include a liquid crystal display (LCD) and/or an organic EL (electro-luminescence) display as the display device.

The operation unit 114 is an input device through which a user may enter various information and/or instructions to the apparatus 100.

The loudspeaker 116 provides the sounds or voices indicating various drive assist information under a control of the processing unit 102.

The position measurement unit 104 provides positioning information for locating the current position of the host vehicle. The unit 104 may include a GPS (Global Positioning System) device which calculates and provides the latitude and longitude of the current position, based on GPS signals including positioning data received from a plurality of GPS satellites. The unit 104 provides the processing unit 102 with the calculated latitude and longitude of the current position. Alternatively, the unit 104 may further receives radio wave from base stations of mobile phones and calculates the latitude and longitude of the current position on the basis of the positioning information from the base stations in addition to the GPS signal.

The wireless communication unit 106 communicates with a server 150 outside the host vehicle, via e.g., a wireless network.

The wired communication I/F 108 is an interface for data exchange via transmission cables with other apparatuses in the host vehicle such as ECUs (Electronic Control Unit) and smartphones. The I/F 108 may operate according to the standard communication specification such as USB (Universal Serial Bus) and CAN (Controller Area Network). As an alternative to the I/F 108, a short-distance wireless communication device, e.g., conforming to Bluetooth standard may be used.

The information storage unit 110 may include any kind of non-volatile and/or volatile memories, such as a semiconductor memory and a hard disk drive (HDD). The unit 110 stores map data 140, regulation information data 142 having the regulation information of each country/region within area expressed by the map data 140, driver data 144 having information about the current driver, and work data 146 generated and referred for processing by the processing unit 102.

The driver data 144 may include an identification code of the current driver (such as the license number of the driver), experience amount (hereinafter also referred to as "driving experience amount") of the driver in the current country/region, and the date of the most recent traffic violation (hereinafter referred as to "the latest violation date") of the driver in the current country/region. The experience amount may include a cumulative travel time, a cumulative travel distance, and a cumulative number of travels (e.g., a cumulative number of times that the driver turns on the ignition switch), in the current country/region.

In this embodiment, these data and information to be stored in the unit 110 may be obtained from the server 150 via the wireless communication unit 106, excluding the work data 146. For example, the apparatus 100 and the server 150 may operate as a part of a system providing so-called cloud computing service. Thereby, even when the host vehicle is e.g., a rental car used by unspecified persons and the driver is changed from one person to another, the apparatus 100 can obtain the driver data 144 about the new driver (i.e., the current driver) from the server 150 based on the identification code of the driver. Similarly, when a car owner has purchased a new car to replace an old one, the apparatus 100 mounted on the new car can obtain the driver data 144 about the owner from the server 150.

Alternatively, the above-mentioned data and information to be stored in the unit 110 may be obtained from personal computers and/or mobile terminals, such as smartphones, via the wired communication I/F 108.

FIG. 2 shows an example of the regulation information data 142 stored in the information storage unit 110. In this example, the regulation information of the states of New York and Connecticut is shown in tabular form. These regulation information may be obtained from the server 150 when the host vehicle runs in the state of New York near the border to the state of Connecticut, for example.

The table shown in FIG. 2 indicates a name of country in the first column (the left-most column), a name of region (e.g., state) in the corresponding country in the second column, a position in the corresponding region in the third column, the regulation information in the fourth column, and a inhibit level in the fifth column.

In the first column, a country code according to ISO 3166-1 standard may be indicated as the name of country. In the example shown in FIG. 2, the code of "USA" is indicated, which means that the corresponding regulation information indicated in the fourth column is related to the U.S.A.

In the second column, a state abbreviation may be indicated as the name of region, for example. "ALL" may be also used to indicate all states or all regions. In the example shown in FIG. 2, "ALL"s, "NY"s, and "CT"s are indicated, which means that the corresponding rows relate to the regulation information about the all states, the New York State, and the state of Connecticut, respectively.

In the third column, an identification code of node or link indicative of e.g., intersection (corresponding to node) and road (corresponding to link) on the map data 140 may be indicated. A code "ALL" may be also used in the third column to indicate all area in the region specified by the second column. In the example shown in FIG. 2, the identification codes of node, "N1234", "N3456", and the identification codes of link, "L2345", "L4567", are indicated, which means that the corresponding rows indicate the regulation information related to the specific intersections and roads identified by these identification codes, respectively.

The fourth column indicates the regulation information related to the location identified by the country name in the first column, the region name in the second column, and the position in the third column. The apparatus 100 provide the regulation information in the fourth column on the display unit 112 when the current position of the host vehicle corresponds to the location identified by the first to third columns.

The inhibit level in the fifth column is a code for specifying whether to inhibit (or hide) the provision of the corresponding regulation information in the fourth column on the display unit depending on the experience amount of the driver in the corresponding region. In the example shown in FIG. 2, the code "1" is indicated, which means that provision of the corresponding regulation information should be inhibited depending on the experience amount of the driver.

FIG. 3 shows examples of driver data stored in the server 150 and the information storage unit 110.

FIG. 3(A) shows an example of the driver data stored in the server 150, which includes information about several drivers. In this example, the information is expressed in tabular form. The table shown in FIG. 3(A) indicates the identification code of a driver in the first column (the left-most column), the experience amount of the driver in each country/region in the second to fifth columns, a latest violation date of the driver in the corresponding country/region in the sixth column. In this example, the experience amount include a cumulative travel time in the third column, a cumulative travel distance in the fourth column, and a cumulative number of travels in the fifth column, in the country/region identified by a name of country/region indicated in the second column.

In the second column, country codes according to ISO 3166-1 standard and state abbreviations each comprising two characters are indicated as the name of country/region. For example, "JP", "DE", "GB", "US", "FR", "CH", and "IT" indicate Japan, Germany, the United Kingdom, the United State of America, France, Switzerland, and Italy.

The table shown in FIG. 3(A) indicates that, for example, the driver identified by the identification code "J12P23TYK" has experiences of driving in Japan ("JP"), Germany ("DE"), the United Kingdom ("GB"), and the New York State ("US/NY") and the state of Connecticut of U.S.A ("US/CT"). And the table indicates that the experience amount of the driver in the New York State include 32 hours of the cumulative travel time, 725 km of the cumulative travel distance, and 4 times of the cumulative number of travels (as indicated in the fourth row (excluding the title rows) of the table).

FIG. 3(B) shows an example of the driver data 144 obtained from the server 150 which stores the information shown in FIG. 3(A). This example assumes that the driver identified by the identification code "J12P23TYK" drives the host vehicle in the New York State. Thus, from the server 150, the corresponding information indicated in the fourth row (excluding the title rows) of the table shown in FIG. 3(A) is downloaded for generating the driver data 144. As a consequence, corresponding to the contents in the fourth row of the table in FIG. 3(A), the driver data 144 shown in FIG. 3(B) includes the identification code of the driver in the first row (excluding the title row), the name of the country/region in the second row, the experience amount in the third to fifth rows, and the latest violation date in the sixth row. The driving data 144 is stored in the information storage unit 110 of the apparatus 100.

The processing unit 102 shown in FIG. 1 is a computer having a processor such as CPU (Central Processing Unit), and memories such as ROMs (Read Only Memory) storing software programs and RAMs (Random Access Memory) for temporal storage of working data. The unit 102 includes a position determination unit 120, a driver information management unit 122, an experience amount determination unit 124, an information presentation control unit 126, and an experience amount update unit 128. These units included in the processing unit 102 are realized by executing software programs on the unit 102 as a computer. The software programs may be stored in any kind of computer readable storage medium.

Alternatively, each of those units included in the unit 102 may be realized with a specialized hardware having one or more electric components.

The position determination unit 120 obtains positioning data (latitude and longitude) for locating the current position of the host vehicle from the position measurement unit 104. The unit 120 also obtains the map data 140 and the regulation information data 142 about the area around the current position from the server 150 outside the host vehicle via the wireless communication unit 106. Then, the unit 120 stores these obtained data in the information storage unit 110. Further, referring the map data 140 stored in the unit 110, the unit 120 determines the current position on the map and also determines the current country/region. The determination of the current position on the map may be performed by means of any known technique such as a map-matching.

The driver information management unit 122 obtains the identification code of the current driver entered through the operation unit 114, when the ignition switch is turned on. The unit 122 also obtains the driver data 144 about the current driver from the server 150 via the wireless communication unit 106. Then, the unit 122 stores the driver data 144 in the information storage unit 110. If the driver data 144 about the current driver already exists in the unit 110, the existing (old) driver data 144 is updated to the new driver data 144 currently obtained from the server 150. At updating the driver data, the latest violation date in the new driver data is compared with that in the old driver data in the unit 110. And, if these two latest violation dates are same, a violation occurrence flag is set to "0" which indicates that there is no additional record of traffic violation. On the other hand, if these two latest violation dates are different each other, the violation occurrence flag is set to "1" which indicates that traffic violation was committed anew.

The processing unit 102 may obtain the state of the ignition switch from ECUs (not shown) via the wired communication I/F 108. And the unit 102 may notify the events of turning on and off the ignition switch to other units such as the driver information management unit 122, the information presentation control unit 126, and the experience amount update unit 128.

The experience amount determination unit 124 refers to the experience amount in the driver data 144 stored in the information storage unit 110. Then, the unit 124 determines whether or not the driver has sufficient experience of driving in the current country/region by comparing each member of the experience amount (i.e., the cumulative travel time, the cumulative travel distance, and the cumulative number of travels) with a corresponding reference value predetermined for each member. The determination result is stored as a value of a experience flag in the work data 146 in the information storage unit 110. That is, if each member of the experience amount is greater than or equal to the corresponding reference value, the experience flag is set to "1" which indicates that the experience is sufficient. Otherwise, the flag is set to "0" indicating that the experience is insufficient.

The information presentation control unit 126 extracts regulation information related to the current position of the host vehicle from the regulation information data 142 stored in the information storage unit 110. Then, the unit 126 checks the experience flag in the work data 146, and provides the display unit 112 with all of or a part of the extracted regulation information depending on a value of the experience flag. That is, if the experience flag has a value "0" (i.e., the experience is insufficient), the unit 126 provides all of the extracted regulation information on the unit 112. Otherwise, i.e., if the experience flag has a value "1" (i.e., the experience is sufficient), the unit 126 stops providing (or hides) the extracted information associated with the inhibit level "1", and provides other extracted information to the unit 112. These processes are performed repeatedly at predetermined intervals. Accordingly, as the host vehicle travels and changes its position, all of or a part of the regulation information related to the latest current position are provided on the display unit 112, depending on the value of the experience flag.

The experience amount update unit 128 checks the violation occurrence flag in the work data 146. If the flag has a value "1", the unit 128 updates the experience amount in the driver data 144 by resetting all members of the experience amount (i.e., cumulative travel time, cumulative travel distance, and cumulative number of travels) to "0". Thereby, even for the driver who has the sufficient amounts of driving experience, the experience amount would be reduced if the driver commits a traffic violation. As a consequence, the experience amount determination unit 124 would set the experience flag to a value "0" and all of the regulation information related to the current position would be presented on the display unit 122 after the violation. As an alternative to the reset of the experience amount, each of the members may be subtracted by a respective predetermined value to update them to have lower values.

The unit 128 initiates a timer (not shown in figures) at the time of turning on the ignition switch and starts a measurement of a travel time, i.e., a time elapsed until the ignition switch is turned off. The unit 128 obtains the odometer values at the times of turning on and off the ignition switch, and calculates a travel distance in the period (hereinafter also referred to as "drive cycle") from when the ignition switch is turned on until the switch is turned off. And, the unit 128 updates the experience amount in the driver data 144 stored in the information storage unit 110 when the ignition switch is turned off. That is, the unit 128 increments the cumulative number of travels by one, adds the measured travel time and the calculated travel distance to the cumulative travel time and the cumulative travel distance, respectively.

Further, the unit 128 sends the driver data 144 including the updated experience amount to the server 150 via the wireless communication unit 106. The server 150 may update its own driver data by using the received data 144, with respect to the experience amount information related to the driver identified by the identification code in the received data 144.

The information providing apparatus 100 described above is capable of providing on the display unit 112 the regulation information related to the country/region where the host vehicle is currently present. And, if each member of the experience amount (e.g., cumulative travel time, cumulative travel distance, cumulative number of travels) of the driver in the current country/region is greater than or equal to the predetermined respective reference value, the apparatus 100 may stop providing the predetermined part of the regulation information (e.g., the predetermined part specific to the country/region) to the unit 112.

In this manner, the apparatus 100 selects the regulation information, depending on the experience amount of the driver, from those related to the current country/region and provides only selected regulation information to the driver. Consequently, the apparatus 100 may realize the proper guidance operation of the regulation information without annoying the experienced drivers and without disturbing their driving behavior.

FIG. 4 shows examples of a screen display of the display unit 112 providing the regulation information. FIG. 4(A) exemplifies the screen display on the unit 112 when the ignition switch is turned on for the first time after entering into the U.S.A. In the screen, the message of "You have entered into the United State of America" is indicated, followed by the message of "In this country, there is no need to stop at a railroad crossing" and "In this country, right turn is allowed even at a red light". These last two messages are the regulation information related to all regions in the U.S.A. extracted from the information shown in FIG. 2. FIG. 4(B) exemplifies the screen display provided at the time when the host vehicle is approaching to a specific intersection in the U.S.A. In the screen, the message of "At this intersection, it is not allowed to cross a double yellow line to turn left" is displayed as the regulation information related to the intersection.

In this embodiment, if the experience amount determination unit 124 determines that the experience amount of the current; driver is not sufficient, then all of the regulation information shown in FIGS. 4(A) and 4(B) are provided on the display unit 112 by the information presentation control unit 126. On the other hand, if the unit 124 determines that the experience amount of the current driver is sufficient, then the unit 126 stops providing (or hides) the regulation information shown in FIG. 4(A) associated with the inhibit level "1" (see FIG. 2), and provides only other regulation information as shown in FIG. 4(B) on the unit 112.

Thereby, the driver having not so much driving experience in the current country/region can obtain even the general regulation information such as those shown in FIG. 4(A), and the careful driving may be ensured. On the other hand, for the driver having much driving experience in the current country/region, the general regulation information as shown in FIG. 4(A) is not displayed. Consequently, the excessive information guidance for the experienced driver is prevented, so that the quick and smooth driving behavior is ensured.

Now, the process of the information providing apparatus 100 will be described.

Figure 5:
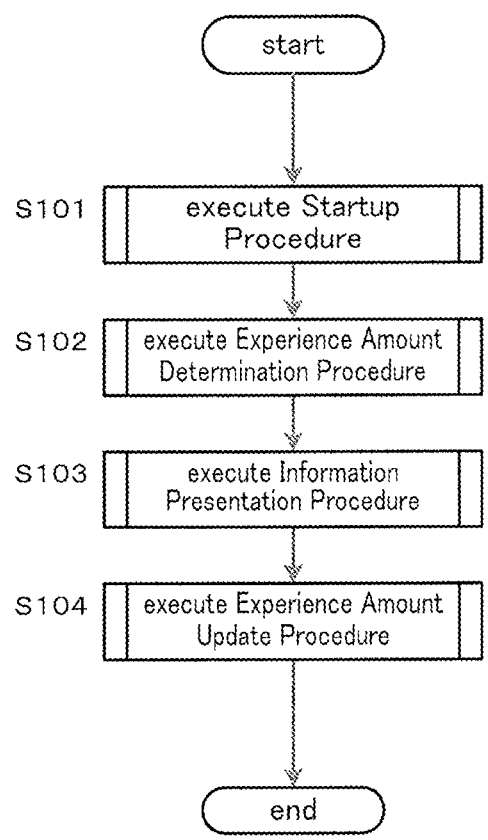
FIG. 5 shows a flow diagram of process performed by the apparatus according to the first embodiment.

FIG. 5 shows a flow diagram of process performed by the apparatus 100.

This process is started by turning on the ignition switch. The information that the ignition switch is turned on is obtained by the processing unit 102 from an in-vehicle ECU via the wired communication I/F 108.

At the beginning of the process, the processing unit 102 executes a startup procedure (S101). In the startup procedure, the map data 140, the regulation information 142, and the driver data 144 are obtained from the server 150 and are stored in the information storage unit 110. In addition, some pre-processes for subsequent procedures are also performed. The startup procedure is detailed below with a reference to FIG. 6.

Next, the processing unit 102 executes an experience amount determination procedure (S102). In this procedure, referring the experience amount in the driver data 144 stored in the unit 110, the unit 102 determines whether or not the experience amount of the driver in the current country/region is sufficient. The experience amount determination procedure is detailed below with a reference to FIG. 7.

Then, the processing unit 102 executes an information presentation procedure (S103). In this procedure, the unit 102 provides the display unit 112 with the regulation information related to the latest current position of the host vehicle as the host vehicle runs. At that time, in accordance with the decision made in the experience amount determination procedure (S102), the unit 102 stops providing (or hide) the predetermined regulation information depending on the experience amount of the driver in the current country/region.

The information presentation procedure in the step of S103 is executed iteratively at predetermined time intervals, and is terminated when the ignition switch is turned off. This procedure is detailed below with a reference to FIG. 8.

After the termination of the information presentation procedure in the step of S103, the processing unit 102 executes an experience amount update procedure (S104), and, then, terminates the process. In the experience amount update procedure, the unit 102 updates the experience amount in the driver data 144 stored in the information storage unit 110, by using the travel time and the travel distance in the time period from when the ignition switch is turned on until when the switch is turned off. And, then, the unit 102 sends the updated driver data 144 to the server 150. The experience amount update procedure is detailed below with a reference to FIG. 9.

Now, the details of the startup procedure (the step S101 in FIG. 5), the experience amount determination procedure (the step S102 in FIG. 5), the information presentation procedure (the step S103 in FIG. 5), and the experience amount update procedure (the step S104 in FIG. 5) will be described.

<The Startup Procedure>

First, the startup procedure will be described with a reference to the flow diagram shown in FIG. 6.

At the beginning of the procedure, the position determination unit 120 starts execution of a data acquisition procedure (S201). In the data acquisition procedure, the unit 120 obtains the positioning data (latitude and longitude) about the current position of the host vehicle from the position measurement unit 104. Then, the unit 120 obtains the map data 140 of an area around the current position and the regulation information 142 related to the area from the server 150 via the wireless communication unit 106. The unit 120 stores these obtained data in the information storage unit 110. After being started at the step S201, the data acquisition procedure continues its execution iteratively at predetermined intervals and concurrently with other procedures. This procedure terminates at the same time that the information presentation procedure (the step S103 in FIG. 5, FIG. 8) terminates.

Next, the unit 120 starts execution of a position location procedure (S202). In this procedure, the unit 120 obtains the positioning data about the current position of the host vehicle from the position measurement unit 104. Then, the unit 120 determines the current position on the map expressed by the map data 140 and also determines the current country/region. After being started at the step S202, the position location procedure continues its execution iteratively at predetermined intervals and concurrently with other procedures. This procedure terminates at the same time that the information presentation procedure (the step S103 in FIG. 5, FIG. 8) terminates.

Next, the experience amount update unit 128 obtains the current odometer value (the odometer is not shown in figures) from an in-vehicle ECU via the wired communication I/F 108, and stores the obtained odometer value in the work data 146 in the information storage unit 110 (S203). Then, the unit 128 starts a measurement of the travel time with a timer (not shown in figures) (S204).

The driver information management unit 122 displays a message prompting to enter the identification code of the current driver on the display unit 112, and obtains the identification code entered via the operation unit 114 (205). Then, the unit 122 sends the obtained identification code to the server 150 and obtains the driver data about the driver identified by the identification code from the server 150 via the wireless communication unit 106 (S206).

Next, the unit 122 determines, based on the identification code entered via the unit 114, whether or not the driver data 144 about the current driver is already stored in the information storage unit 110 (S207). If the data 144 of the current driver is not yet stored in the unit 110 (S207, No), the unit 122 sets the violation occurrence flag to "0" (S208), and stores the driver data obtained from the server 150 in the unit 110 as the driver data 144 (S209).

On the other hand, if the driver data 144 about the current driver was already stored in the unit 110, the unit 122 determines whether or not the latest violation date in the (old) driver data 144 already stored in the unit 110 is the same as that in the (new) driver data currently obtained from the server 150 (S210). If both of the latest violation dates are same (S210, Yes), the unit 122 moves its process to the step S208.

On the other hand, if these two latest violation dates are different from each other (S210, No), the unit 122 sets the violation occurrence flag to "1" (S211) and moves its process to the step S209.

Next, the experience amount update unit 128 checks whether or not the violation occurrence flag in the work data 146 is "0" (S212). If the flag is "0" (S212, Yes), the unit 128 terminates the startup procedure. On the other hand, if the flag is "1" (S212, No), the unit 128 resets each member of the experience amount (i.e., the cumulative travel time, the cumulative travel distance, and the cumulative number of travels) to "0" (S213), and terminates the startup procedure. As an alternative to the reset of the experience amount in the step S213, each member of the experience amount may be subtracted by a respective predetermined value.

<The Experience amount Determination Procedure>

Figure 7:
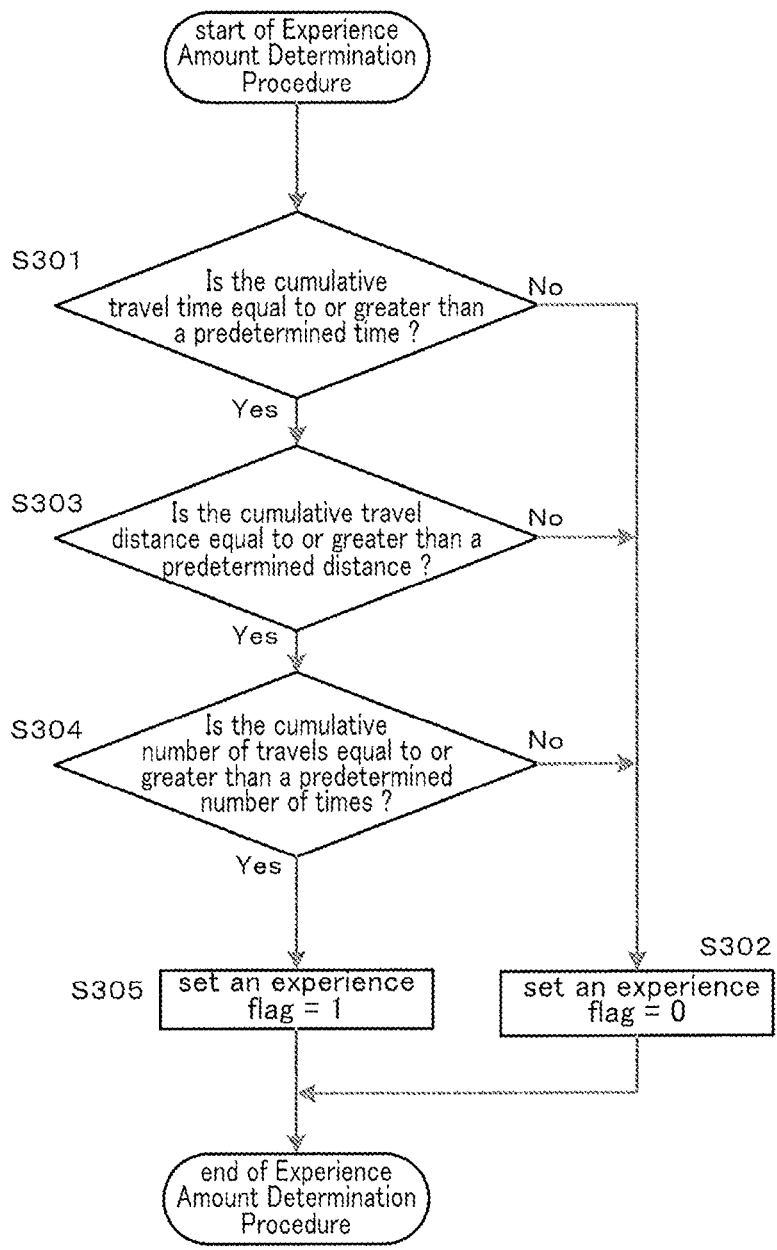
FIG. 7 shows a flow diagram of an experience amount determination procedure in the apparatus according to the first embodiment.

Now, the experience amount determination procedure (the step S102 in FIG. 5) will be detailed with a reference to the flow diagram shown in FIG. 7. In this procedure, each member of the experience amount (the cumulative travel time, the cumulative travel distance, and the cumulative number of travels) is compared with a predetermined respective reference value (i.e., a predetermined time, a predetermined distance, or a predetermined number of times). And, then, whether or not the driving experience in the current country/region is sufficient is determined.

At the beginning of the procedure, the experience amount determination unit 124 determines whether or not the cumulative travel time in the driver data 144 stored in the information storage unit 110 is equal to or greater than the predetermined time (S301). If the cumulative travel time is less than the predetermined time (S301, No), the unit 124 sets the experience flag to "0" (S302), and terminates this experience amount determination procedure.

On the other hand, if the cumulative travel time is equal to or greater than the predetermined time (S301, Yes), the unit 124 determines whether or not the cumulative travel distance in the driver data 144 stored in the unit 110 is equal to or greater than the predetermined distance (S303). If the cumulative travel distance is less than the predetermined distance (S303, No), the unit 124 moves its process to the step S302. On the other hand, if the cumulative travel distance is equal to or greater than the predetermined distance (S303, Yes), the unit 124 determines whether or not the cumulative number of travels in the driver data 144 stored in the unit 110 is equal to or greater than the predetermined number of times (S304).

And, if the cumulative number of travels is less than the predetermined number of times (S304, No), the unit 124 moves its process to the step S302. On the other hand, if the cumulative number of travels is equal to or greater than the predetermined number of times (S304, Yes), the unit 124 sets the experience flag to "1" (S305), and terminates this experience amount determination procedure.

<The Information Presentation Procedure>

Figure 8:
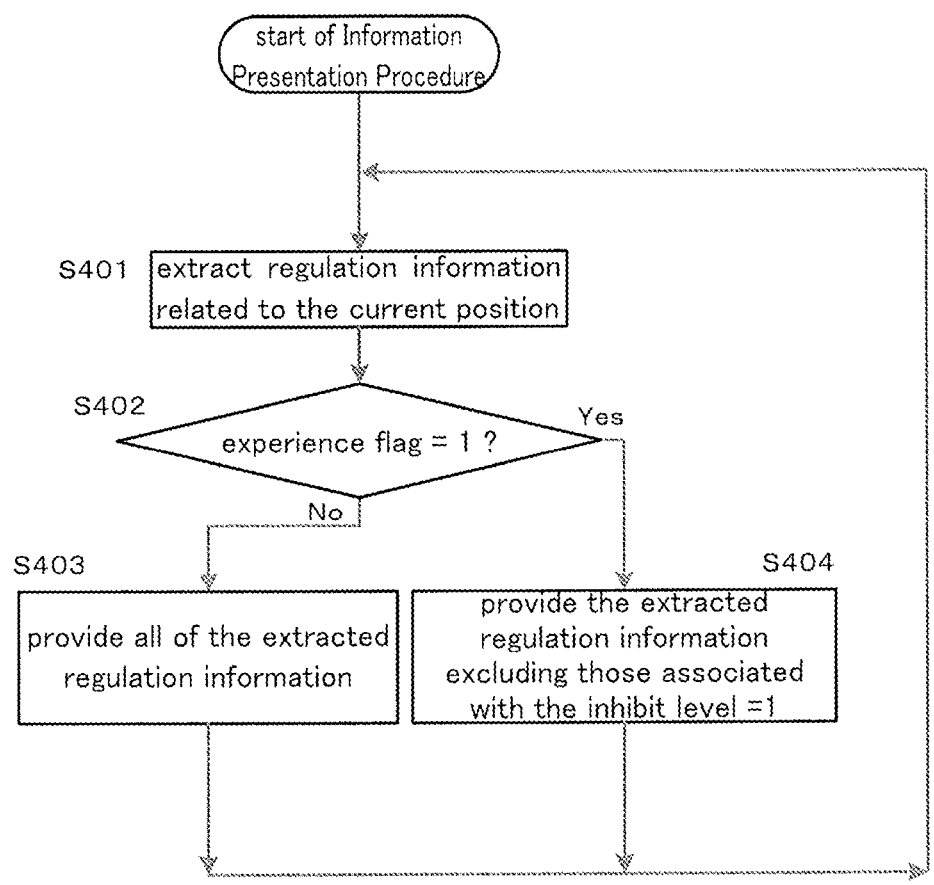
FIG. 8 shows a flow diagram of an information presentation procedure in the apparatus according to the first embodiment.

Now, the information presentation procedure (the step S103 in FIG. 5) will be detailed with a reference to the flow diagram shown in FIG. 8.

At the beginning of the procedure, the information presentation control unit 126 extracts the regulation information related to the current position of the host vehicle from the regulation information data 142 stored in the information storage unit 110 (S401). Then, the unit 126 checks whether or not the experience flag in the work data 146 stored in the unit 110 is "1" (i.e., the experience is sufficient) (S402). If the flag is not "1" (S402, No), the unit 126 provides all of the regulation information on the display unit 112 (S403), and repeats this procedure from the step S401.

On the other hand, if the experience flag is "1" in the step S402 (S402, Yes), the unit 126 provides the regulation information extracted at the step S401 excluding those associated with the inhibit level "1" on the unit 112 (S404), and repeats this procedure from the step S401.

This information presentation procedure is terminated when the processing unit 102 obtains the information that the ignition switch is turned off, from an in-vehicle ECU via the wired communication I/F 108.

<The Experience Amount Update Procedure>

Figure 9:
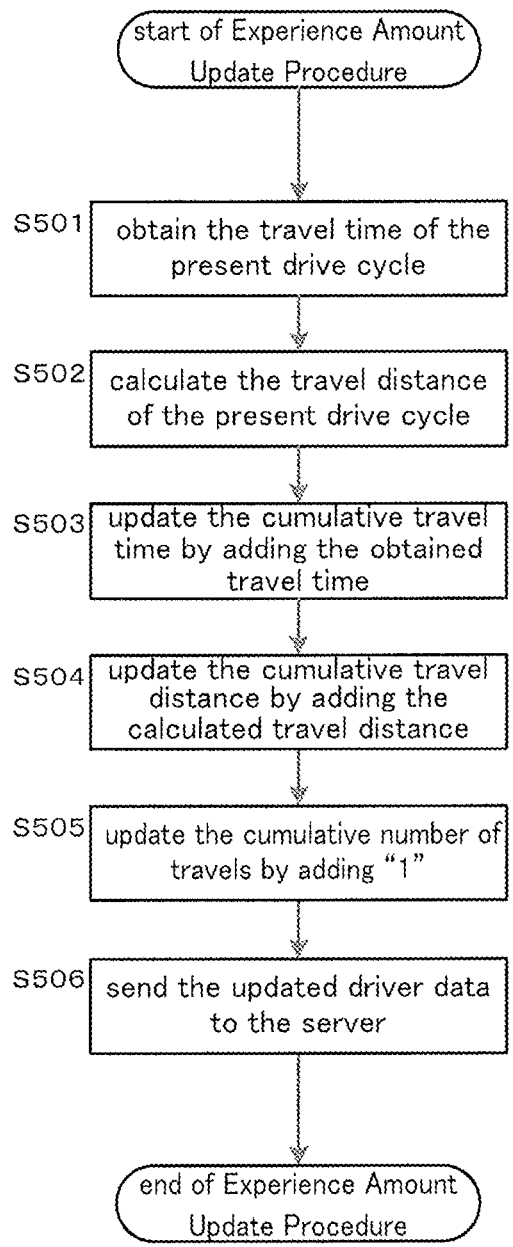
FIG. 9 shows a flow diagram of an experience amount update procedure in the apparatus according to the first embodiment.

Now, the experience amount update procedure (the step S104 in FIG. 5) will be detailed with a reference to the flow diagram shown in FIG. 9. This procedure starts when the ignition switch is turned off and the information presentation procedure (the step S103 in FIG. 5, FIG. 8) terminates.

At the beginning of the procedure, the experience amount update unit 128 terminates the measurement of time which is started in the startup procedure (at the step S204 in FIG. 6), and obtains the measured travel time of the present drive cycle from the timer (S501).

Next, the unit 128 obtains the current odometer value, and calculates the travel distance of the present drive cycle by subtracting the odometer value obtained at the startup procedure in the work data 146 stored in the unit 110 from the odometer value currently obtained (S502).

Then, the unit 128 updates the cumulative travel time in the driver data 144 stored in the unit 110 by adding the travel time obtained at the step S501 to said cumulative travel time (S503). The unit 128 also updates the cumulative travel distance in the driver data 144 by adding the travel distance calculated at the step S502 to said cumulative travel distance (S504). Further, the unit 128 updates the cumulative number of travels in the driver data 144 by adding 1 to said cumulative number of travels (S505). In this manner, all members of the experience amount in the driver data 144 stored in the information storage unit 110 are updated.

Next, the unit 128 sends the driver data 144 including the updated experience amount stored in the unit 110 to the server 150 via the wireless communication unit 106 (S506), and terminates this experience amount update procedure.

The information for updating the latest violation date in the driver data may be provided from e.g., the server of administrative agencies to the server 150. Alternatively, the driver may enter own traffic violation information to the apparatus 100 via the operation unit 114. Based on the entered information, the driver information management unit 122 may update the latest violation date in the driver data 144 stored in the unit 110, and the experience amount update unit 128 may send the updated latest violation date to the server 150 at the step S506 in FIG. 9.

As described above, the apparatus 100 according to the first embodiment displays the regulation information on the display unit 112 as the drive assist information, but is not limited to this configuration. Alternatively, the regulation information may be provided through the loudspeaker 116 as voice messages.

In this embodiment, the driver data about the current driver including information on the driving experience amount is downloaded from the server 150. Alternatively, the driver data about a plurality of drivers, including the driving experience amount of each driver, may be stored in the information storage unit 110 or other storage unit(s) (not shown in figures) of the apparatus 100. The driver information management unit 122 may extract the driving experience amount of the current driver from said driver data including the driving experience amount of each driver. And, the processing unit 102 may operates using the extracted experience amount of the current driver.

Figure 6:
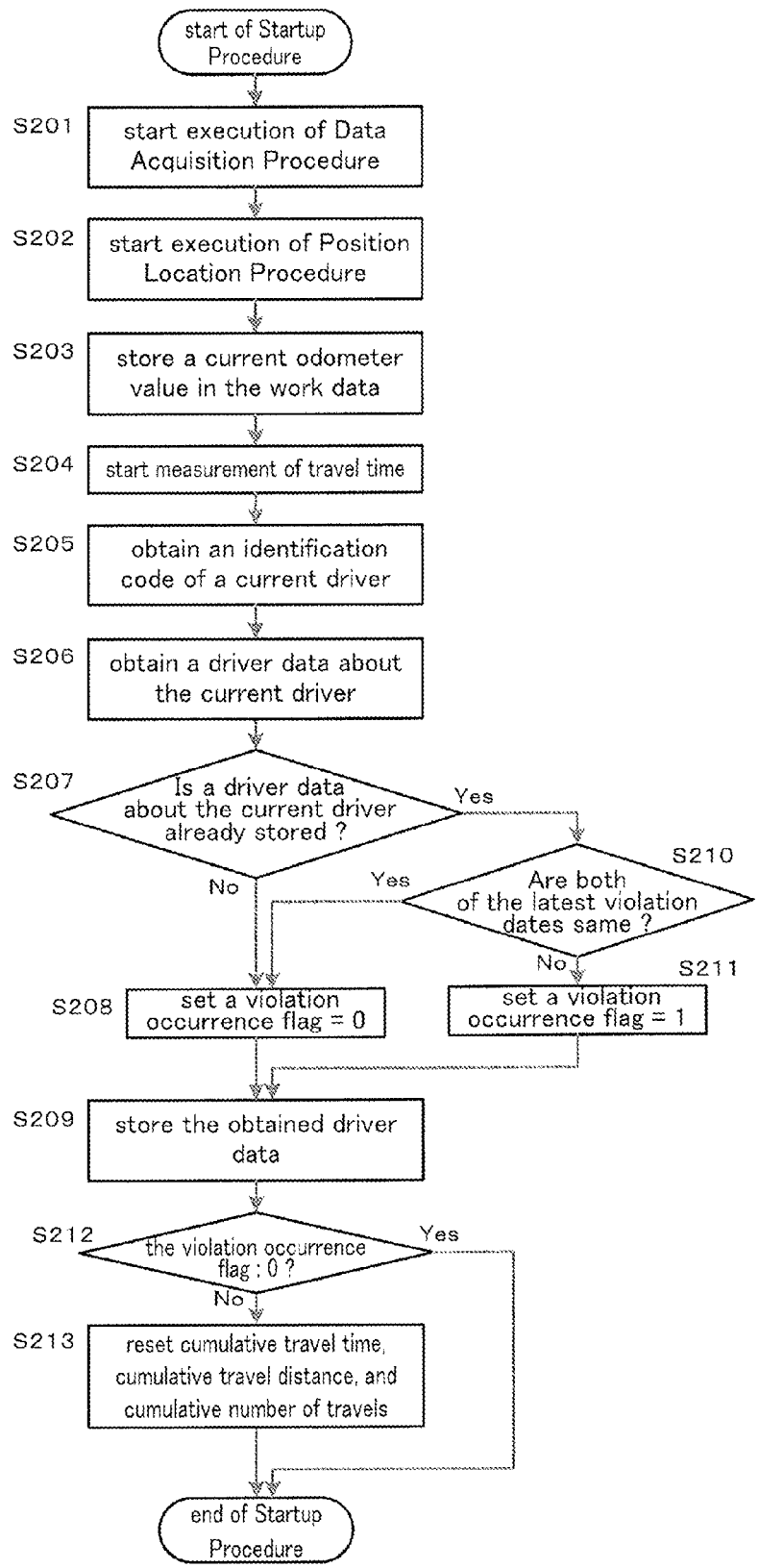
FIG. 6 shows a flow diagram of an startup procedure in the apparatus according to the first embodiment.

Further, in this embodiment, the driving experience amount is reset to 0 when the driver commits a traffic violation (the steps S212 and S213 in FIG. 6). Alternatively, the experience amount may be reduced or reset depending on a non-travel period which is defined as a period from the last time the driver drove in the country/region. For example, if the non-travel period is equal to or greater than the predetermined period (or time length), the experience amount of the driver related to the country/region may be reduced or reset to 0. The amount of the reduction or the determination whether to reset may be depend on the length of the non-travel period. For example, the experience amount is reduced to a half when the non-travel period is equal to or greater than 5 years, and the experience amount is reset to 0 when the non-travel period is equal to or greater than 10 years. For this purpose, the last drive date of each country/region may be stored in the driver data 144. The experience amount update unit 128 may calculate the non-travel period on the basis of the last drive date and the current date, and may perform the reduction or reset of the experience amount.

Further, in this embodiment, the information presentation control unit 126 operates on the basis of the regulation information as shown in FIG. 2, and provide the predetermined message shown in the fourth column of the table in FIG. 2 as the regulation information. Alternatively and/or additionally, some supplementary information may be added to the message, such as a distance from the current position to the point related to the regulation information. For example, the distance is measured by using the map data 140, and the message having the measured distance as the supplementary information may be provided as a regulation information, such as "There is a congestion charge zone about 500 m ahead. For entering this zone, a charge of £100 must be paid in advance. Do you pay this charge ?".

In some cases, the regulation information to be provided has some conditions, such as the information that the traffic on a specific road is restricted to the vehicles with a registration number plate having the specific number (odd or even) on a specific day of the week. In that case, the information presentation control unit 126 may present such regulation information after determining whether or not the relevant conditions are met. More specifically, for example, the information providing apparatus 100 has a watch and stores, in advance, a registration number on the number plate of the host vehicle in the work data 146. Then, only when the regulation information is determined to be applicable in view of the relevant condition, the regulation information, such as "This vehicle is not allowed to run in the city of San Paulo, as today is Wednesday", may be provided on the display unit 112.

Further, in this embodiment, the driver enters own identification code via the operation unit 114 so that the apparatus 100 can identify the current driver. Alternatively, the processing unit 102 may identify the current driver from the driver's face. For example, the apparatus 100 may have a camera which captures an image of the driver's face, and the processing unit 102 may identify the current driver by executing the face recognition process on the captured image (e.g., comparing the captured image with preregistered face images). As a further alternative, the camera may capture an image of the driver's fingerprint, and the processing unit 102 may identify the current driver by executing the fingerprint recognition process on the captured image (e.g., comparing the captured image with preregistered fingerprint images).

Further, in this embodiment, each members of the driving experience amount of the driver in the current country/region, that is, the cumulative travel time, the cumulative travel distance, and the cumulative number of travels, is compared with the respective reference values, that is, the predetermined time, distance, and number of times prestored in the information storage unit 110 (FIG. 7). Additionally or alternatively, these reference values may differ for each country/region. For example, the reference values may be set differently for each country/region depending on a degree of difference in the traffic rules and/or traffic regulations from a reference country/region. The reference country/region may be defined as the country/region where the driver has the highest values of the driving experience amount. As the "degree of difference in the traffic rules and/or traffic regulations", the number of the rules and/or regulations being different from those in the reference country/region may be used, for example. Alternatively, the reference country/region may be defined as the country/region where the host vehicle were present before entering into the current country/region.

Additionally, the information providing apparatus 100 may have route searching function. The apparatus 100 may search and display a route(s) to a destination so that the number of the regulation information to be provided on the display unit 112 in the information presentation procedure (FIG. 8) is minimized, depending on a value of the experience flag.

For example, after the host vehicle enters into a left-hand traffic country from a right-hand traffic country, the routes to a destination which minimizes the number of right turns may be searched and displayed if the driver has small experience amount of driving in the entering country.

Further, in this embodiment, the determination whether or not the driving experience amount is equal to or greater than the respective reference value is performed. Alternatively, using a plurality of reference values for each member of the experience amount, the driving experience amount of the driver may be classified into one of plural levels (referred to as "driving experience levels" or "experience levels") depending on a range of the experience amount. In this case, which regulation information the apparatus 100 would stop providing (or hide) are predetermined for each experience levels so that the number of the information to be hid increases (i.e., the number of the information displayed on the unit 112 decreases) with a rise of the driving experience level resulted from an increase of the experience amount of the driver.

Second Embodiment

Next, the information providing apparatus according to a second embodiment of the present invention will be described.

The apparatus 100 according to the first embodiment provides the regulation information on the display unit 112 as display messages, but the present invention is not limited to this configuration. The information providing apparatus may provide the regulation information as data to other apparatuses.

In the second embodiment, the information providing apparatus is implemented as a mobile terminal such as a smart phone, and provides an in-vehicle navigation system with the regulation information as data. The navigation system may process the received data and display the regulation information on an own display unit.

Figure 10:
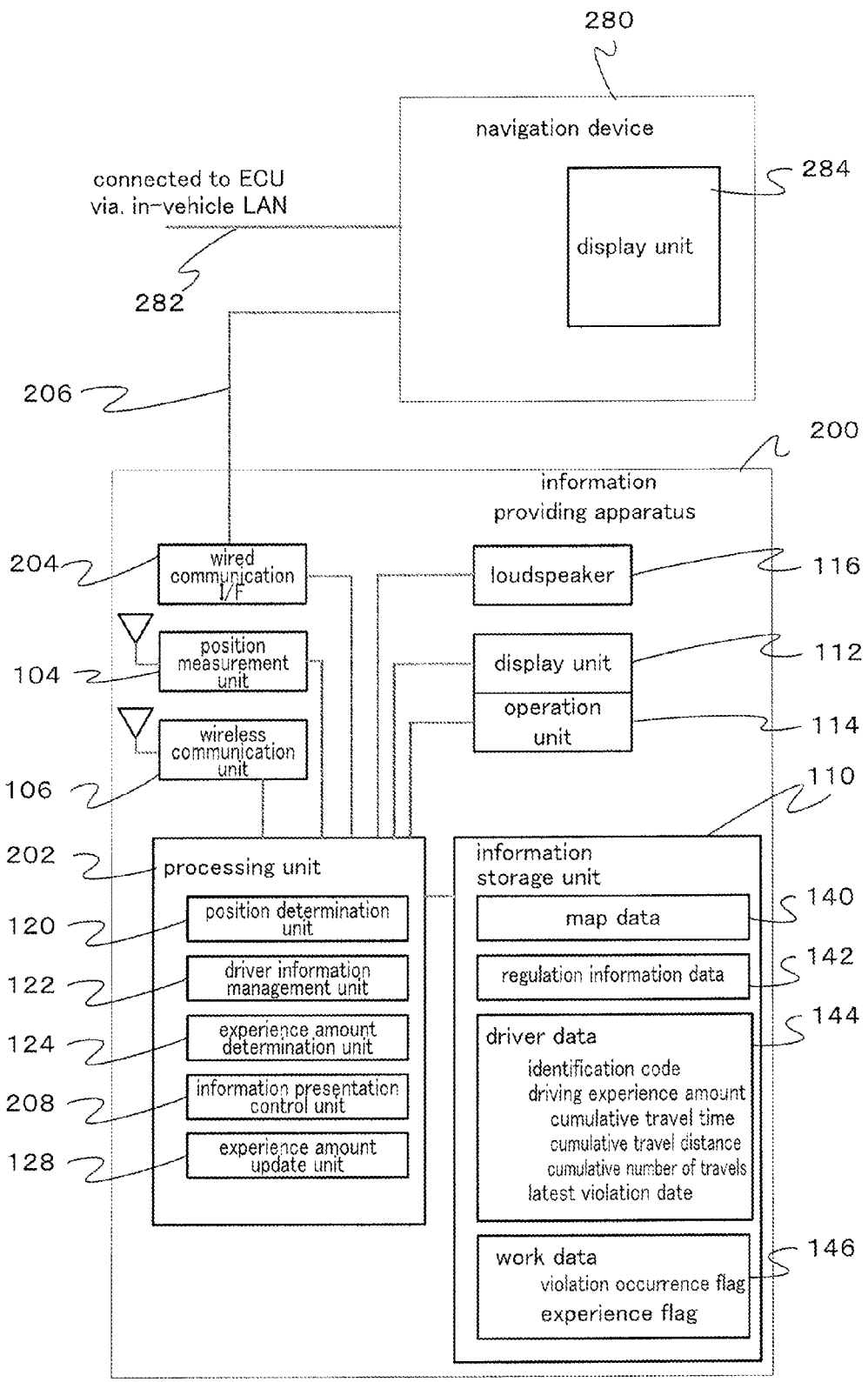
FIG. 10 shows a block diagram of an information providing apparatus according to a second embodiment of the present invention.

FIG. 10 shows a configuration of the information providing apparatus according to the second embodiment. The components identical with those shown in FIG. 1 are designated by the same reference numerals. And, with respect to the components designated by the same reference numerals as those in FIG. 1, the above description regarding those components is incorporated here.

The information providing apparatus 200 is implemented as a mobile terminal such as a smart phone, and comprises a processing unit 202, the position measurement unit 104, the wireless communication unit 106, the information storage unit 110, the display unit 112, the operation unit 114, the loudspeaker 116, and a wired communication I/F 204.

The wired communication I/F 204 may operate according to e.g., USB specifications, and is connected to a navigation device 280 via a communication cable 206.

The navigation device 280 is connected via a communication cable 282 to an in-vehicle LAN (Local Area Network) operating in accordance with e.g., CAN specifications, and communicates with in-vehicle ECUs via the in-vehicle LAN. The device 280 includes a display unit 284 comprising e.g., a liquid crystal display.

The processing unit 202 in the apparatus 200 has the same configuration as the apparatus 100 according to the first embodiment with the exception of including an information presentation control unit 208 instead of the unit 126.

The navigation device 280 obtains information on the state of the ignition switch from an in-vehicle ECU (not shown in figures) via the cable 282, and then the processing unit 202 obtains that information from the navigation device 280 through the cable 206 and the wired communication I/F 204. The unit 202 notifies the event of turning on and off the ignition switch to the driver information management unit 122, the information presentation control unit 208, the experience amount update unit 128, etc.

The unit 208 has the same function as that of the unit 126 with the exception of providing the navigation device 280, via the unit 204 and the cable 206, with the regulation information related to the current position which is extracted from the regulation information data 142 stored in the unit 110. The device 280 may display the provided regulation information on e.g., the display unit 284.

The process flow of the information providing apparatus 200 is the same as that of the apparatus 100 (shown in FIGS. 5 to 9) with the exception of providing the regulation information to the I/F 204 (accordingly, to the navigation unit 280 connected to the I/F 204) instead of the display unit 112 in the steps S403 and S404 of the information presentation procedure (FIG. 8).

In this second embodiment, the information providing apparatus 200 may be implemented as a mobile terminal such as a smart phone, and the mobile terminal may store its owner's drive data including the owner's identification code in the unit 110, so that the apparatus 200 may have higher usability or conveniency.

The units included in the processing unit 202, such as the position determination unit 120, the driver information management unit 122, the experience amount determination unit 124, the information presentation control unit 208, and the experience amount update unit 128, are realized by executing application software programs for the mobile terminal (i.e., the apparatus 200) on the unit 202 as a computer.

Third Embodiment

Next, the information providing apparatus according to a third embodiment of the present invention will be described.

The apparatus according to the third embodiment displays a warning message when the driver performs inappropriate driving operation not complying with traffic rules indicated in the regulation information.

Figure 11:
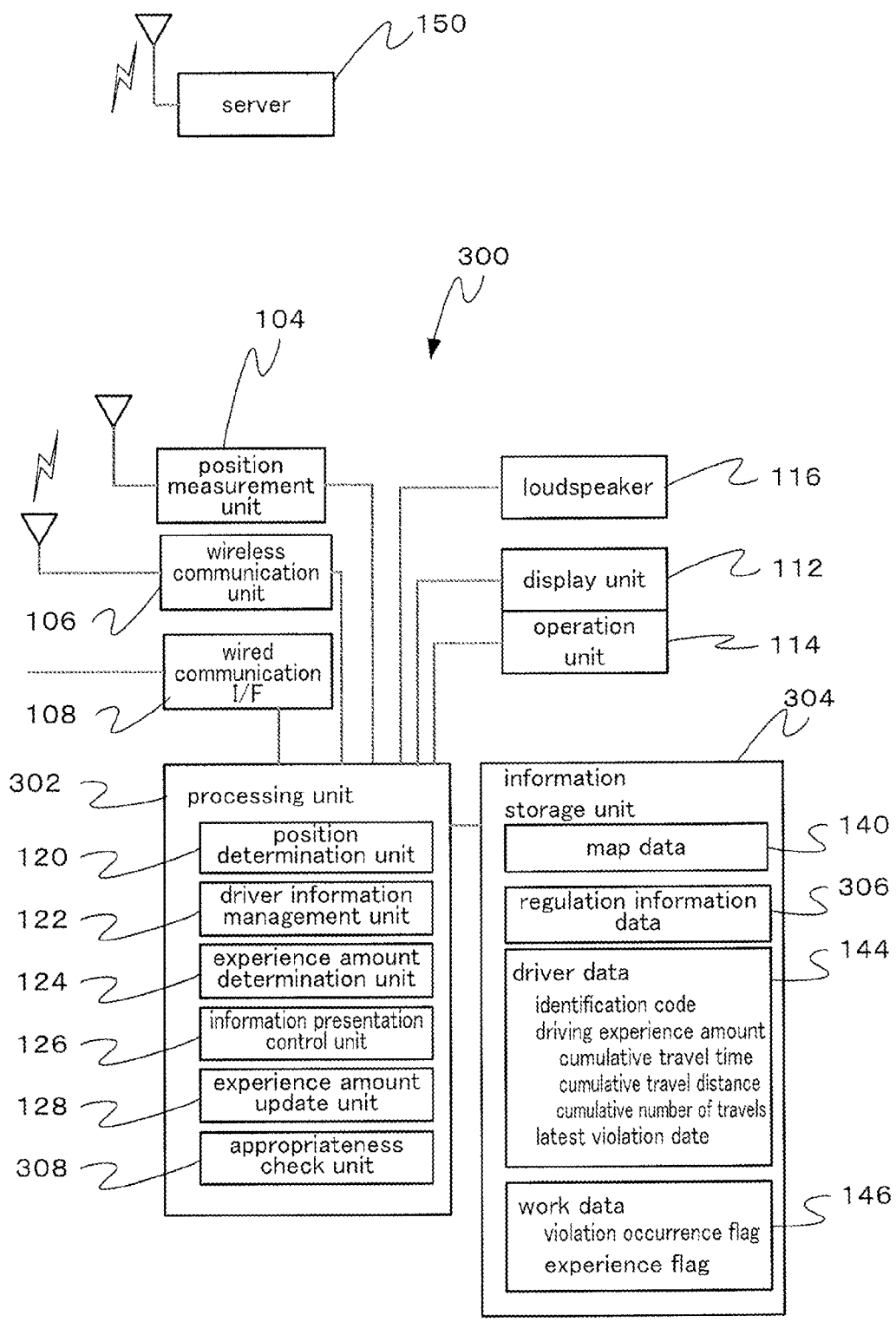
FIG. 11 shows a block diagram of an information providing apparatus according to a third embodiment of the present invention.

FIG. 11 shows a configuration of the information providing apparatus according to the third embodiment. The components identical with those shown in FIG. 1 are designated by the same reference numerals. And, with respect to the components designated by the same reference numerals as those in FIG. 1, the above description regarding those components is incorporated here.

The information providing apparatus 300 has the same configuration as the apparatus 100 according to the first embodiment with the exception of including a processing unit 302 and an information storage unit 304 instead of the unit 102 and 110.

The information storage unit 304 has the same configuration as the unit 110 shown in FIG. 1 with the exception of storing regulation information data 306 instead of the data 142. The data 306 has the same contents as those of the data 142 (FIG. 2) and further includes information about inappropriate operations which should not be performed in view of traffic regulation or rules indicated by the corresponding regulation information.

FIG. 12 shows an example of the regulation information data 306. In the table shown in FIG. 12, the first (the left-most) column to the fifth column are the same as those in the table of the regulation information data 142 shown in FIG. 2. And the table shown in FIG. 12 further includes the sixth column (the right-most column) for indicating "inappropriate operation". In this example, the inappropriate operation of "stop", "turn_left", and "low_limit_30" is indicated in the sixth column.

The inappropriate operation of "stop" means that you should not (or need not to) stop at the location identified by the information indicated in the first to third column, according to the regulation information of "In this country, there is no need to stop at a railroad crossing". And, the inappropriate operation of "turn_left" and "low_limit_30" mean that turning left and driving at speed below the low (minimum) speed limit of 30 km/h are not allowed, respectively, at the location identified by the information indicated in the first to third column of the respective row.

The processing unit 302 shown in FIG. 11 has the same configuration as that of the unit 102 shown in FIG. 1 with the exception of further including an appropriateness check unit 308 which determines whether or not a driving operation performed by the driver is appropriate in view of the regulation information related to the current position. The unit 308 may be realized by executing software programs on the unit 302 as a computer. Alternatively, the unit 308 may be implemented as a hardware including one or more electrical components.

The unit 308 reads the regulation information data 306 stored in the information storage unit 304 and checks a value of the experience flag in the work data 146. And, the unit 308 selects the regulation information not related to the inhibit level "1" if the value of the experience flag is "1". Otherwise, the unit 308 selects all of the regulation information. Then, the unit 308 determines, for each of the selected regulation information, whether or not the inappropriate operation is specified for the current position (i.e., whether or not any inappropriate operation is indicated in the sixth column of the corresponding row, in the table shown in FIG. 12).

If any inappropriate operation is specified for the current position, the unit 308 obtains information about the current driving operation from in-vehicle ECUs via the wired communication I/F 108, and determines whether or not the current driving operation corresponds to the inappropriate operation specified for the current position. And, if the unit 308 determines that the current operation corresponds to the inappropriate operation, a warning message is displayed on the display unit 112.

For example, when the inappropriate operation for the current position is "stop" (no need to stop) and the vehicle speed obtained from an ECU becomes 0, then the unit 308 determines that the current driving operation corresponds to the inappropriate operation, and a warning message is displayed on the unit 112. In the same way, when the inappropriate operation for the current position is "low_limit_30" (minimum speed limit 30 km/h) and the vehicle speed obtained from ECU becomes less than 30 km/h, then a warning message is displayed on the unit 112.

Further, for example, when the inappropriate operation for the current position is "turn_left" (no left turn) and information on the turning angle (e.g., information based on output from a yaw rate sensor (not shown in figures)) obtained from an ECU becomes greater than a predetermined angle towards the left, then the unit 308 determines that the current driving operation corresponds to the inappropriate operation, and a warning message is displayed on the unit 112.

In this manner, the information providing apparatus 300 may assist the driver more adequately by providing not only the regulation information but also the information whether or not the current driving operation is appropriate in view of the provided regulation information.

In this embodiment, the warning messages are displayed on the display unit 112. Alternatively, the warning message may be provided as voice messages from the loudspeaker 116.

In this embodiment, the determination whether or not the current driving operation is appropriate in view of the regulation information is performed based on the information on the vehicle speed and/or the turning angle. Alternatively, the determination may be performed based on information about other driving operations such as the operation on an acceleration pedal and/or a brake pedal (e.g., their on/off state or operation amount for them), and the operation on the steering wheel (a turning direction and/or angle). In this case, a possibility of an occurrence of the behavior such as stop, left turn, and deceleration to a speed below the minimum limit can be determined before the behavior actually occurs, so that the apparatus 300 may assist the driver more effectively.

As described above, the information providing apparatus according to each of the embodiments determines whether or not the experience amount of the current driver in the current country/region is sufficient. And, if the experience amount is insufficient, the apparatus displays all of the regulation information related the current country/region. On the other hand, if the experience amount is sufficient, the apparatus stops providing (or hides) at least a part of the regulation information. Thereby, the apparatus may ensure the less-experienced driver to keep in mind to drive carefully, while to the experienced driver the apparatus may assist the quick and smooth driving behavior by providing the regulation information in such proper number as do not result in disturbance for driving behavior.

Specific embodiments of the present invention have been described above. It should be noted that the present invention is not limited to these embodiments and that numerous changes and modifications of the embodiments may be made without departing from the scope of the invention.

REFERENCE SIGNS LIST

100, 200, 300 information providing apparatus
102, 202, 302 processing unit
104 position measurement unit
106 wireless communication unit
108, 204 wired communication interface (I/F)
110, 304 information storage unit
112, 284 display unit
114 operation unit
116 loudspeaker
120 position determination unit
122 driver information management unit
124 experience amount determination unit
126, 208 information presentation control unit
128 experience amount update unit
140 map data
142, 306 regulation information data
144 driver data
146 work data
206, 282 communication cable
280 navigation device
308 appropriateness check unit

What is claimed is:

1. An apparatus for providing drive assist information comprising
a processing unit for managing provision of the drive assist information, configured to:
determine a country and/or region where a host vehicle currently travels;
determine whether or not a driving experience amount of a driver in the determined country/region reaches a predetermined reference value; and
stop providing at least part of the assist information related to the country and/or region where the host vehicle currently travels, if the driving experience value reaches the predetermined reference value.

2. The apparatus according to claim 1, wherein the processing unit is further configured to, on the basis of information about traffic violations of the driver in the country and/or region where the host vehicle currently travels, reduce or reset to zero the driving experience amount related to the country and/or region when the driver commits a traffic violation.

3. The apparatus according to claim 1, wherein the processing unit further configured to, when a non-travel period in the country/region where the host vehicle currently travels is equal to or greater than a predetermined period, reduce or reset to zero the driving experience amount related to the country and/or region, wherein the non-travel period is a period from the last time the driver drove in the country and/or region.

4. The apparatus according to claim 1, wherein the at least part of the assist information which the processing unit stops providing in the case that the driving experience amount reaches the predetermined reference value is information for preventing traffic violations.

5. The apparatus according to claim 1, wherein at least one of a cumulative travel time, a cumulative travel distance, and a cumulative number of travels in the country and/or region where the host vehicle currently travels is used as the driving experience amount.

6. The apparatus according to claim 1, wherein the processing unit is further configured to:
identify a current driver, and
stop providing the at least part of the assist information depending on the driving experience amount of the identified current driver.

7. A method of providing drive assist information, comprising:
determining a country and/or region where a host vehicle currently travels;
determining whether or not a driving experience amount of a driver in the determined country/region reaches a predetermined reference value; and
stopping providing at least part of the assist information related to the country and/or region where the host vehicle currently travels, if the driving experience value reaches the predetermined reference value.

8. The method according to claim 7, further comprising, on the basis of information about traffic violations of the driver in the country and/or region where the host vehicle currently travels, reducing or resetting to zero the driving experience amount related to the country and/or region when the driver commits a traffic violation.

9. The method according to claim 7, further comprising, when a non-travel period in the country/region where the host vehicle currently travels is equal to or greater than a predetermined period, reducing or resetting to zero the driving experience amount related to the country and/or region, wherein the non-travel period is a period from the last time the driver drove in the country and/or region.

10. The method according to claim 7, wherein the at least part of the assist information which is stopped being provided in the case that the driving experience amount reaches the predetermined reference value is information for preventing traffic violations.

11. The method according to claim 7, wherein at least one of a cumulative travel time, a cumulative travel distance, and a cumulative number of travels in the country and/or region where the host vehicle currently travels is used as the driving experience amount.

12. The method according to claim 7, further comprising:
identifying a current driver, and
stopping providing the at least part of the assist information depending on the driving experience amount of the identified current driver.

* * * * *